I. V. KETCHAM.
Measuring Milk Pail.
No. 231,811.                    Patented Aug. 31, 1880.
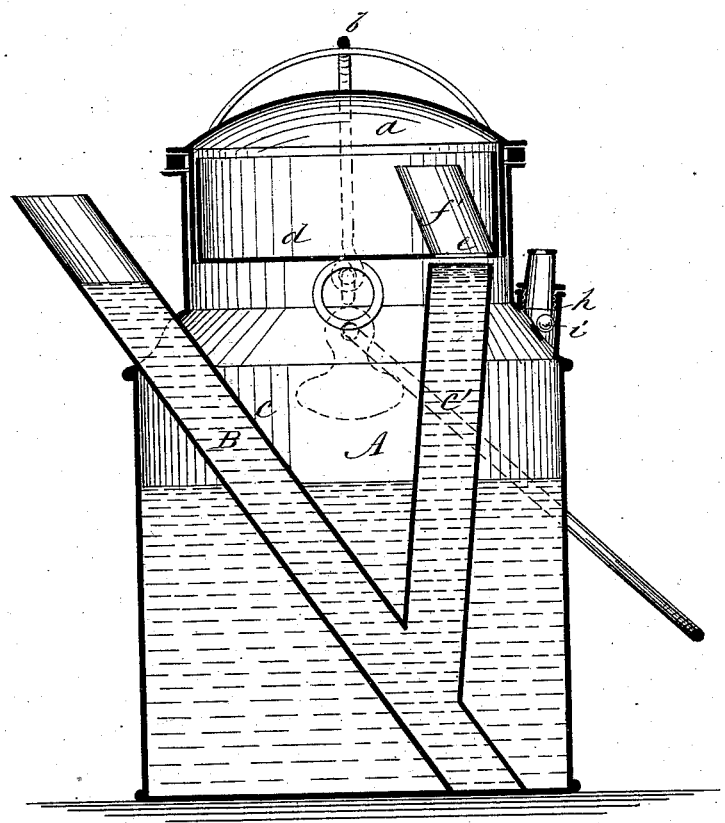
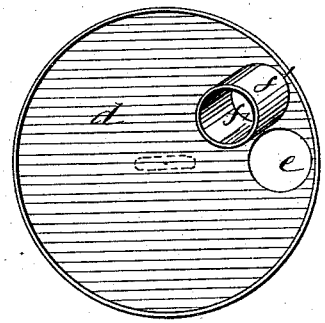
WITNESSES:
C. Neveux
C. Sedgwick
INVENTOR:
I. V. Ketcham
BY Munn & Co
ATTORNEYS.

UNITED STATES PATENT OFFICE.

ISRAEL V. KETCHAM, OF BROOKLYN, NEW YORK.

MEASURING MILK-PAIL.

SPECIFICATION forming part of Letters Patent No. 231,811, dated August 31, 1880.

Application filed February 5, 1880.

*To all whom it may concern:*

Be it known that I, ISRAEL V. KETCHAM, of Brooklyn, in the county of Kings and State of New York, have invented a new and useful Improvement in Milk-Pails, of which the following is a specification.

My invention relates to milk-pails used by dealers for delivering milk in small quantities to consumers; and the object of the invention is to furnish a self-measuring pail from which a regulated quantity of fluid shall run at each inversion of the pail.

My invention consists in a closed pail fitted with an inner tube or receptacle connected with the nozzle, and provided with a hollow cover with an opening for allowing milk to enter the cover and a second opening that connects with the inner receptacle of the pail, so that by inversion of the pail in the act of pouring the cover is filled and from the cover the inner receptacle is filled when the pail is righted.

My improved pail is shown in the accompanying drawings, wherein Figure 1 is a vertical section of the pail, and Fig. 2 is a plan view of the cover.

Similar letters of reference indicate corresponding parts.

A is the pail, of usual shape and material, fitted with a flanged cover, $a$, that is held tightly in place by a shackle, $b$, and an elastic ring is inserted beneath the flange of the cover to render it air-tight.

B is the inner receptacle, preferably consisting of two tubes, $c$ $c'$, the tube $c$ extending from the bottom of the pail in an inclined direction through the side of the pail to form a pouring-nozzle, and the tube $c'$ connecting with $c$ near the lower end and extending upward and terminating near the bottom of the cover.

The tubes $c$ $c'$ are to hold a regulated quantity of fluid when filled to the top of tube $c'$—say one pint or a quart.

The cover $a$ is fitted with a flanged bottom piece, $d$, held in place by friction between its flanges and the flanges of the cover, so that it may be readily removed for cleaning, and when in place, as shown, the piece $d$ and cover form a hollow receptacle, of which $d$ is the bottom, and which receptacle is to hold more of the fluid than is required to fill the tubes $c\,c'$.

In the piece $d$ there are two apertures, $e$ $f$, one of which is fitted with a short tube, $f'$, rising within the cover, so as to prevent escape of fluid from the hollow cover when the pail is upright, except by the opening $e$, and allowing fluid to enter the cover by opening $f$ when the pail is inverted or tipped.

The cover is to be put on the pail with the aperture $e$ coinciding with the open upper end of tube $c'$.

In one side of the pail is fitted a short tube, $h$, for admitting air to the inside of the pail, and within this tube is a valve, $i$, that closes the tube when the pail is inverted and prevents escape of milk.

By this construction the milk poured out at each inversion of the pail will be only that contained in the tubes $c$ $c'$. As the pail is turned to pour out the milk in the tubes the cover $a$ will fill from the milk in the pail passing in by the opening $f$. Then as the pail is righted the milk in the cover will pass by opening $e$ into tubes $c'$ and $c$, filling them, and the surplus will run over the top of $c'$, so the desired quantity is measured for the next pouring.

By the use of this pail the waste and trouble resulting from the use of a dipper to measure the milk are avoided, and there being no necessity of removing the cover, the milk is kept free from dust and dirt.

If desired, a second tube may be fitted beneath tube $c$, and communicating therewith by an opening fitted with a slide, so that when the slide is opened the second tube may fill from tube $c$, and an increased quantity of fluid be delivered when required.

Having thus described my invention, I claim as new and desire to secure by Letters Patent—

1. The automatic measuring-pail, consisting of a closed vessel fitted with a hollow cover and an inner receptacle connected with a pouring-nozzle, the cover having two openings in the bottom, one of which communicates with the inner receptacle, substantially as shown and described.

2. In combination with a pail, the hollow cover $a$, having openings $e\,f$, and the measuring-receptacle $c\,c'$, combined for use in the manner substantially as shown and described.

3. In pails fitted with an inner measuring and pouring receptacle, the cover $a$, fitted with the apertured bottom piece, $d$, having the openings $e\,f$, substantially as and for the purposes set forth.

ISRAEL V. KETCHAM.

Witnesses:
GEO. D. WALKER,
C. SEDGWICK.